(No Model.)
E. E. MANN.
FOG SIGNAL.
No. 361,430. Patented Apr. 19, 1887.
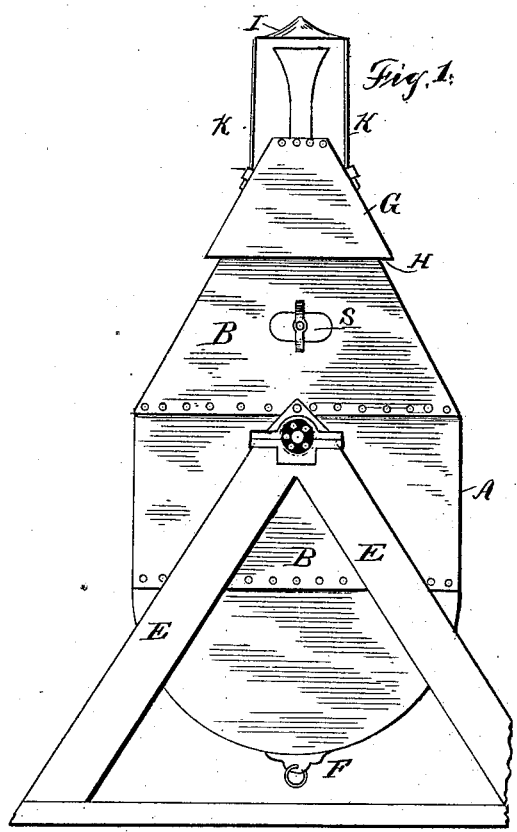
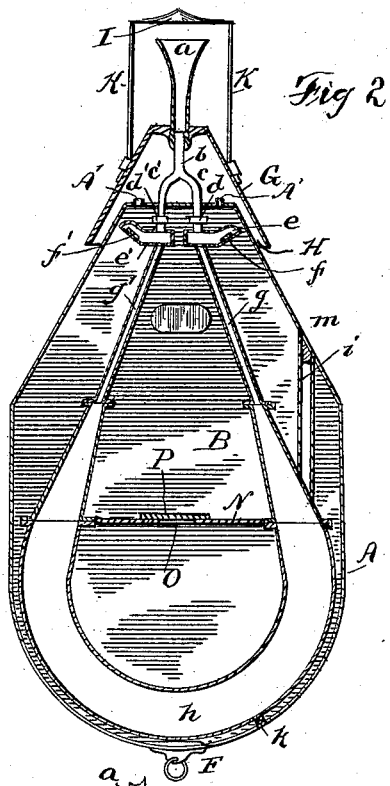
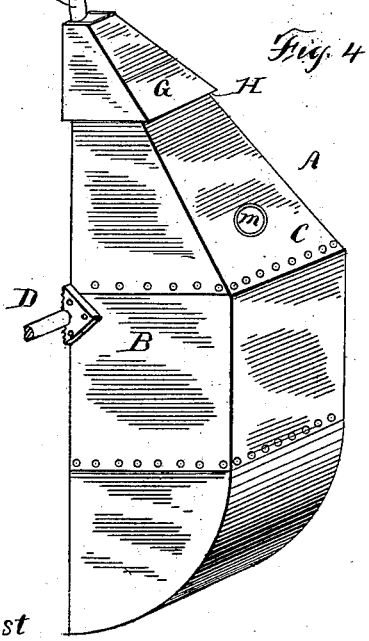
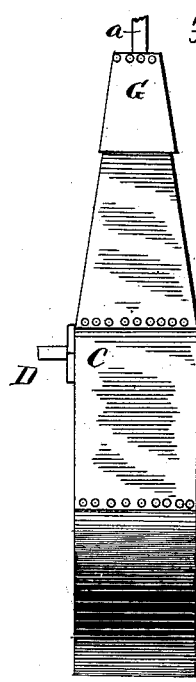
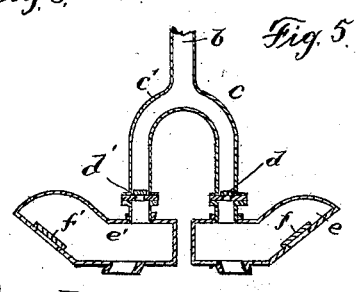
Attest:
C. W. H. Brown,
Frank Brawner
Inventor:
Edgar E. Mann
By Wallace A. Bartlett
His atty.
N. PETERS, Photo-Lithographer, Washington, D. C.

UNITED STATES PATENT OFFICE.

EDGAR EBENEZER MANN, OF NEWBURG, NEW YORK, ASSIGNOR TO ADALAIDE ELLIOTT MANN, OF SAME PLACE.

FOG-SIGNAL.

SPECIFICATION forming part of Letters Patent No. 361,430, dated April 19, 1887.

Application filed February 10, 1887. Serial No. 227,210. (No model.)

*To all whom it may concern:*

Be it known that I, EDGAR EBENEZER MANN, residing at Newburg, in the county of Orange and State of New York, have invented certain new and useful Improvements in Fog-Signals, of which the following is a specification, reference being had therein to the accompanying drawings.

This invention relates to fog-horns; and it consists in the peculiar construction and combination of parts, hereinafter described.

The object of the invention is to produce a fog-horn for use on docks, piers, or in other positions where there is an even floor or foundation on which the device may rest.

The device is of the kind known as "trunnioned" or "swinging" fog-horns.

In the drawings, Figure 1 is a side elevation of the fog-horn and its casing and support. Fig. 2 is a central section of Fig. 1, the supporting-frame being omitted. Fig. 3 is an end view of the fog-horn and its casing. Fig. 4 is a perspective of one-half of the horn and its casing. Fig. 5 is an enlarged detail of Fig. 1.

A indicates the casing, within which the sounding apparatus is inclosed. This casing is composed of metallic side plates, B, and edge plates, C. The side plates may be in one piece, or in sections riveted together, and the same is true of the edge plates.

Trunnions D are attached to the side plates at a position a little above the center of gravity of the casing. These trunnions rest on suitable bearings, preferably ball-bearings, on the supporting-frame E, so that the casing A may be easily rocked on its trunnions. A ring, F, or similar device, at the bottom of the casing, serves for the attachment of a rope or other device by which the casing is rocked.

A housing, G, covers the upper portion of casing A, overhanging the same, and leaving a passage, H, between the housing and the lower part of the casing. A cover, I, surmounts the fog-horn, and is sustained by rods K from the housing G. The fog-horn *a* is supported by the casing, and passes through the top of housing G, as shown, the open end being protected from the weather by cover I, which is detachable. The inner or reed end of the fog-horn is connected with a pipe, *b*, which has two branches, *c* and *c'*. Each of these branches has a check-valve, as at *d d'*, the valve opening upward. Below the valves *d d'* are chambers *e e'*, each having a valve, *f f'*, opening inwardly and communicating with the air inside the casing A. The casing A has apertures A', by which the air finds entrance from under the housing. A tube, *g*, extends from chamber *e*, and a tube, *g'*, from the chamber *e'*, and these tubes connect with the opposite ends of the liquid-chamber *h*, all being inclosed within the casing A.

A cross-plate, N, crosses the casing A a little below the middle, the ends of the liquid-chamber *h* passing through this plate. The plate N serves as a strengthening-piece for the whole casing, and as a support for the ends of the chamber *h*. A man-hole, O, covered by cover P, gives access to the lower part of the casing below plate N. The edges of plate N are bent at a right angle and riveted to casing A. A tube, *i*, connects the chamber *h* with the outside of the casing, so that liquid—as water or oil—may be poured into the chamber *h* from outside the casing. A tube, K, having a stopper outside the casing A, serves for the escape of the liquid from chamber *h* when it is desired to empty said chamber. A cover, *m*, in the casing A, protects the outside of tube *i*. A man-hole plate, S, covers an opening in one or both of the plates B, by which access is had to the interior of casing A.

The chamber *h* is filled with oil, or other suitable liquid, say, nearly up to the level of the plate N. Then, when the casing is made to rock on its trunnion, the water will flow to one end of the chamber *h*, forcing the air ahead of it. Thus, if the casing be rocked so as to drive the water in the direction of chamber *e*, the air-pressure will close the valve *f'* and open that *d'*, so that the air will be forced out through the fog-horn *a*. At the same time the valve *f* will be opened to admit air into the opposite end of chamber *h*, the valve *d* being closed by the pressure of air within the tube *b*. When the casing is swung the other way, a reversal of the operation takes place. Thus the horn will be made to sound as long as the rocking of the casing is continued.

The casing serves to give solidity to the structure, as well as support and protection to the tubes and chambers constituting the sounding and blowing apparatus.

I claim—

1. A fog-signal casing consisting of metallic side plates having trunnions attached thereto and edge plates secured to said side plates, an air-forcing apparatus, substantially as described, within the casing, and a fog-horn having its mouth outside thereof, combined with a pair of supporting-standards on which the trunnions of the casing rest, all being and operating substantially as described.

2. The fog-signal casing having its body portion polygonal in horizontal cross-section and provided with trunnions, the air-forcing apparatus contained therein, the fog-horn having its mouth outside said casing, the cross-plate extending across the casing so as to support the tubes inside thereof and having its edges secured to the casing, the cross-plate being provided with a man-hole, and the supporting-standards on which said trunnions rest, all in combination, substantially as set forth.

3. The combination, with the fog-horn casing having the air-forcing apparatus inclosed therein and the fog-horn projecting therefrom, of the removable cover above said horn, said cover being supported by detachable rods connected to the casing, substantially as described.

4. A fog-horn casing consisting of flat side plates and curved end plates forming a covering which is polygonal in horizontal cross-section, the trunnions attached to the flat side plates, the supporting-standards having anti-friction bearings for said trunnions, the inclosed air-forcing apparatus, and the projecting horn, all combined and relatively arranged substantially as described.

In testimony whereof I affix my signature in presence of two witnesses.

EDGAR EBENEZER MANN.

Witnesses:
I. T. JOSLIN,
J. A. JOSLIN.